(12) United States Patent
Simons et al.

(10) Patent No.: US 11,912,231 B2
(45) Date of Patent: Feb. 27, 2024

(54) INFLATOR WITH OPEN CENTER GENERANT HOLDER

(71) Applicant: ARC TECHNOLOGY HOLDING LIMITED, Kowloon (HK)

(72) Inventors: Philip C. Simons, Knoxville, TN (US); Dylan Sanders, Knoxville, TN (US)

(73) Assignee: ARC TECHNOLOGY HOLDING LIMITED, Kowloon (HK)

( * ) Notice: Subject to any disclaimer, the term of this patent is extended or adjusted under 35 U.S.C. 154(b) by 142 days.

(21) Appl. No.: 17/511,308

(22) Filed: Oct. 26, 2021

(65) Prior Publication Data

US 2022/0126780 A1    Apr. 28, 2022

Related U.S. Application Data

(60) Provisional application No. 63/105,967, filed on Oct. 27, 2020.

(51) Int. Cl.
*B60R 21/264* (2006.01)
*B60R 21/26* (2011.01)

(52) U.S. Cl.
CPC ............ *B60R 21/2644* (2013.01); *B60R 2021/26041* (2013.01)

(58) Field of Classification Search
CPC ............................. B60R 2021/26041
USPC ................. 102/530–531; 280/741, 736, 740
See application file for complete search history.

(56) References Cited

U.S. PATENT DOCUMENTS

| 5,513,572 A | 5/1996 | Frantom et al. |
| 5,615,912 A | 4/1997 | O'Loughlin et al. |
| 6,042,146 A | 3/2000 | Bauer et al. |
| 6,725,781 B2 | 4/2004 | Niemeyer et al. |
| 6,935,655 B2 * | 8/2005 | Longhurst ........... B60R 21/2644 280/736 |
| 7,695,010 B2 | 4/2010 | Perez et al. |
| 7,770,924 B2 | 8/2010 | Cox et al. |
| 7,950,692 B2 | 5/2011 | Clark et al. |
| 8,052,169 B2 | 11/2011 | Yano et al. |
| 8,191,927 B2 | 6/2012 | Jordan et al. |
| 10,207,671 B2 | 2/2019 | Last et al. |
| 2004/0201208 A1 | 10/2004 | Longhurst et al. |
| 2005/0236821 A1 | 10/2005 | Hofmann et al. |

(Continued)

FOREIGN PATENT DOCUMENTS

| DE | 10 2013 216 401 | 2/2015 |
| DE | 10 2015 016083 | 6/2017 |

(Continued)

OTHER PUBLICATIONS

Extended European Search Report dated Mar. 11, 2022 issued in European Patent Application No. 21204953.0, 10 pp.

*Primary Examiner* — Reginald S Tillman, Jr.
(74) *Attorney, Agent, or Firm* — NIXON & VANDERHYE P.C.

(57) ABSTRACT

An airbag inflator includes a pressure vessel, an initiator positioned at one end of the pressure vessel, a manifold positioned at an opposite end of the pressure vessel, and a generant holder assembly secured in the pressure vessel adjacent the initiator. The generant holder assembly defines an annular space that is configured to secure a generant. A center of the generant holder assembly is open. The open center allows a pressure wave from the initiator to travel to the outlet burst disk.

19 Claims, 5 Drawing Sheets

(56) References Cited

U.S. PATENT DOCUMENTS

| | | |
|---|---|---|
| 2012/0048137 A1 | 3/2012 | Hagihara et al. |
| 2012/0187668 A1 | 7/2012 | Lewis et al. |
| 2017/0259775 A1 | 9/2017 | Bierwirth |
| 2019/0351864 A1 | 11/2019 | Hillmann et al. |

FOREIGN PATENT DOCUMENTS

| | | |
|---|---|---|
| DE | 10 2016 124 680 | 6/2018 |
| DE | 102019124042 A1 * | 3/2021 |
| WO | WO 2009/043904 | 4/2009 |
| WO | WO 2016/025152 | 2/2016 |

* cited by examiner

INFLATOR WITH OPEN CENTER GENERANT HOLDER

CROSS-REFERENCES TO RELATED APPLICATIONS

This application claims the benefit of U.S. Provisional Patent Application No. 63/105,967, filed Oct. 27, 2020, the entire content of which is herein incorporated by reference.

STATEMENT REGARDING FEDERALLY SPONSORED RESEARCH OR DEVELOPMENT (NOT APPLICABLE)

BACKGROUND

The invention relates to airbag inflators and, more particularly, to an airbag inflator including an open center generant holder that enables the pressure wave from the initiator to travel to the outlet burst disk.

Existing inflator designs typically include structure that blocks the pressure wave, including propellant, cups and the like that create a tortuous path for the pressure wave. These inflators must increase the structural strength to offset the higher internal operating pressures (IOP) that are typical for tortuous path designs.

SUMMARY

The inflator design of the described embodiments endeavors to improve the pressure wave while having a consistent burn of the generant to lower variability. The optimized ignition lowers the IOP/MEOP, which allows the design to meet higher safety factor requirements.

The inflator according to the described embodiments includes a modified generant holder with an annular ledge that contains the generant in the annular area between the holder and the wall of the pressure vessel. A generant cover is used to hold the generant in place. This allows the area in the center of the holder to be open and not obstruct the pressure wave. Holes in the holder serve to control the propellant burn and allow for consistent heating of the inert gas. The inert gas flows out of the manifold into the airbag. The manifold chokes the flow of the gas controlling the slope and time to maximum pressure.

The inflator functions by activating the initiator, which breaks through the initiator sleeve. This action serves to ignite the generant and allows the pressure wave to travel to the outlet burst disk to open the disk. Inert gas in the pressure vessel flows through the manifold to inflate the airbag.

In an exemplary embodiment, an airbag inflator includes a pressure vessel, an initiator positioned at one end of the pressure vessel, a manifold positioned at an opposite end of the pressure vessel, and a generant holder assembly secured in the pressure vessel adjacent the initiator. The generant holder assembly defines an annular space that is configured to secure a generant. A center of the generant holder assembly is open.

The generant holder assembly may include a generant holder with a tubular body and an annular ledge, where the annular ledge has a larger diameter than the tubular body and is sized to be press fit into the pressure vessel. A generant cover includes a central opening sized to fit over the tubular body of the generant holder and an outside diameter sized to be press fit into the pressure vessel.

A generant may be positioned in the annular space engaging the annular ledge, where the generant cover is selectively positionable over the tubular body to engage and secure the generant in the annular space. A position of the generant cover may be varied as a function of an amount of the generant in the annular space. In some embodiments, the generant cover is U-shaped, and a bottom of the U-shape engages the generant in the annular space.

The generant holder may include at least one row, preferably two rows, of holes arranged circumferentially in the tubular body.

The annular ledge may be U-shaped and continuous with the tubular body. The generant cover may also be U-shaped.

In some embodiments, the generant holder assembly may further include a sleeve such as a paper sleeve or the like positioned over the tubular body. The sleeve may be positioned between the annular ledge and the generant cover.

The manifold may include a plurality of apertures and may be configured to choke gas flow to control a slope, internal operating pressure, and time to maximum pressure.

In another exemplary embodiment, an airbag inflator includes a pressure vessel, an initiator positioned at one end of the pressure vessel, a manifold positioned at an opposite end of the pressure vessel, and a generant holder secured in the pressure vessel adjacent the initiator. The generant holder has a tubular body and an annular ledge. The annular ledge has a larger diameter than the tubular body and is sized to be press fit into the pressure vessel. The generant holder defines an annular space between the tubular body and an interior wall of the pressure vessel, where a center of the generant holder is open. A generant is positioned in the annular space and engages the annular ledge. A generant cover secured in the pressure vessel over the tubular body of the generant holder is selectively positioned to engage and secure the generant in the annular space.

BRIEF DESCRIPTION OF THE DRAWINGS

These and other aspects and advantages will be described in detail with reference to the accompanying drawings, in which.

DETAILED DESCRIPTION

Figure 1:
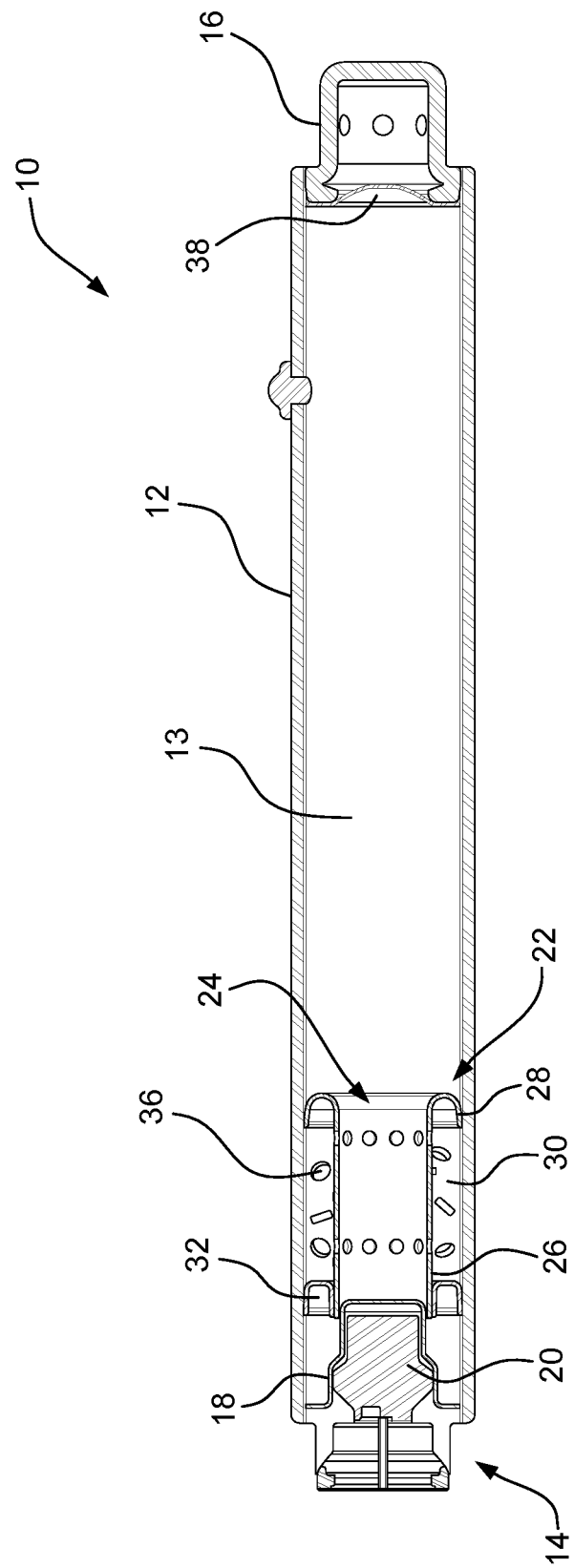
FIG. 1 is a cross-sectional view of the inflator according to the described embodiments.

With reference to FIG. 1, the airbag inflator 10 of the described embodiments includes a pressure vessel 12 containing a gas mixture 13, an initiator assembly 14 secured at one end of the pressure vessel 12, and a manifold 16 secured at an opposite end of the pressure vessel 12. The initiator assembly 14 receives an ignition signal and activates inflation of the airbag. The initiator assembly 14 includes an initiator sleeve 18 that houses the initiator 20. The initiator assembly 14 is known and is similar to initiating assemblies of existing airbag inflators, and further details will not be described.

Figure 2:
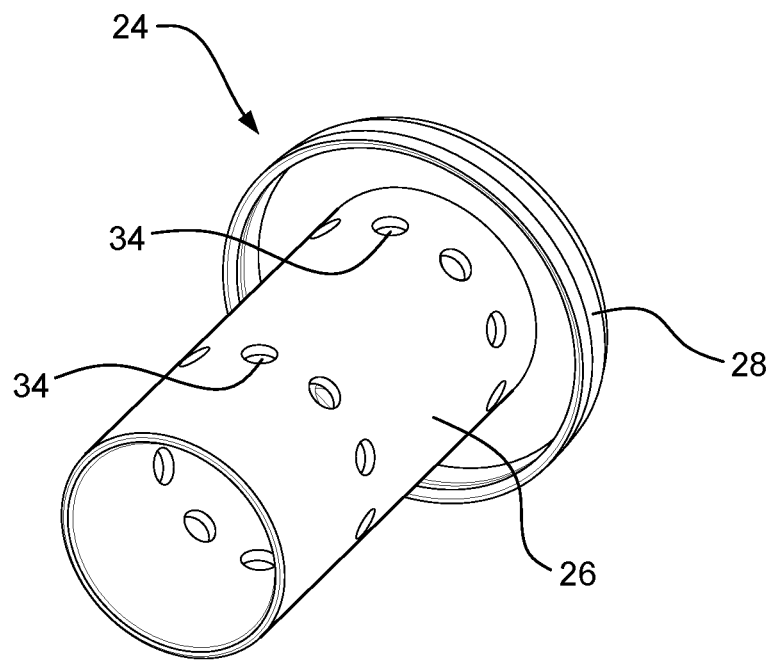
FIG. 2 is a perspective view of the generant holder.
Figure 3:
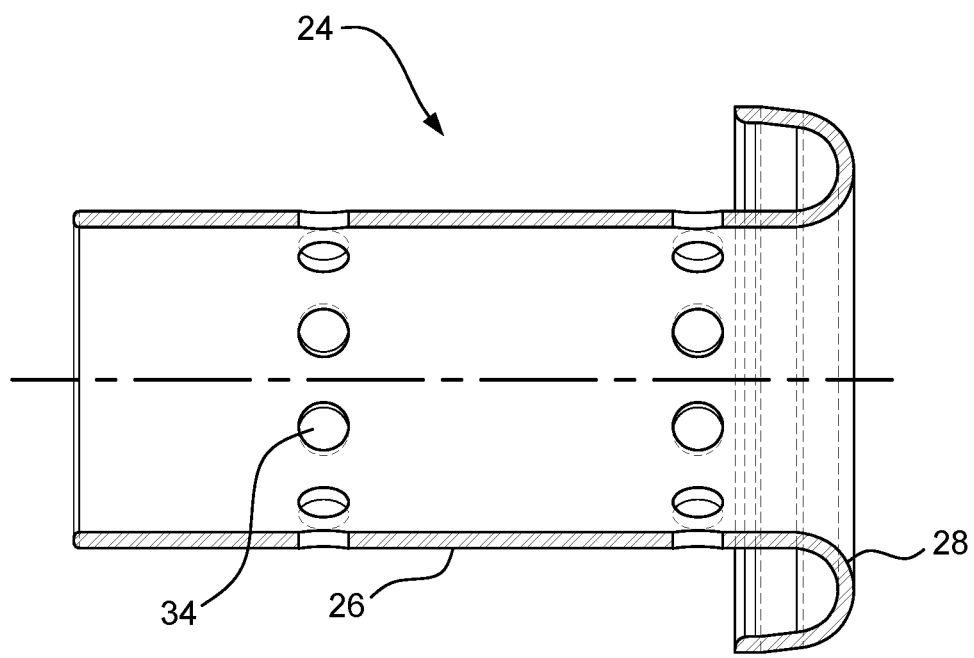
FIG. 3 is a side view of the generant holder shown in FIG. 2.

A generant holder assembly 22 is secured in the pressure vessel 12 adjacent the initiator assembly 14. The generant holder assembly 22 includes a generant holder 24 having a tubular body 26 and an annular ledge 28. See FIGS. 2 and 3. There is a clearance between the generant holder 24 and the initiator sleeve 18 to allow for gas flow. As shown, the annular ledge 28 has a larger diameter than the tubular body 26. In some embodiments, the annular ledge 28 is U-shaped and is continuous with the tubular body 26. The outside diameter of the annular ledge 28 is sized to be press fit into the pressure vessel 12. Because the tubular body 26 has a smaller diameter than the annular ledge 28, the generant holder defines an annular space 30 for containing the generant.

Figure 4:
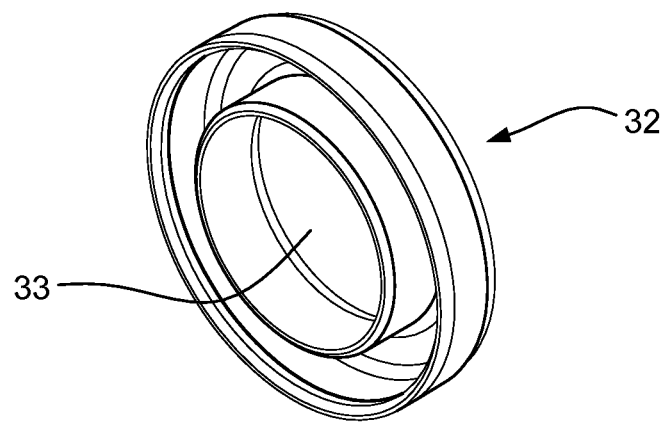
FIG. 4 is a perspective view of the generant cover.
Figure 5:
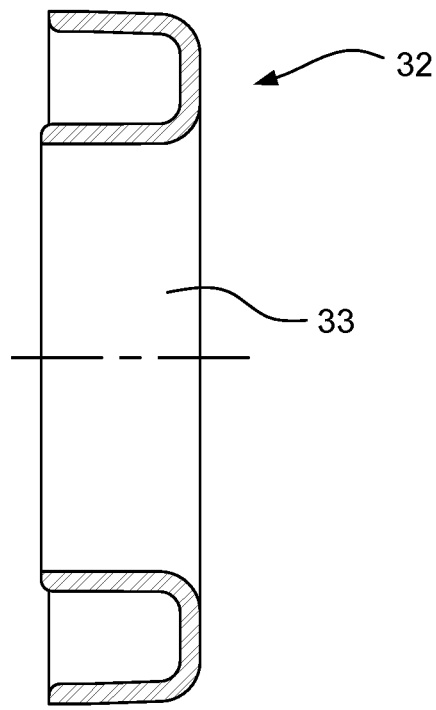
FIG. 5 is a side sectional view of the generant cover.

The generant holder assembly 22 also includes a generant cover 32 including a central opening 33 that is sized to fit over the tubular body 26 of the generant holder 24. See FIGS. 4 and 5. The generant cover 32 is similarly sized to be press fit into the pressure vessel 12. In some embodiments, the generant cover 32 is U-shaped, and a bottom of the U-shape faces the annular space 30 and the annular ledge 28.

The generant holder 24 may be provided with one or more rows of apertures 34. As discussed in more detail below, the apertures 34 serve to control the burn of the generant and allow consistent heating of the inert gas. The apertures 34 are sized to contain the generant in the annular space.

A generant 36 is positioned in the annular space 30 and engages the annular ledge 28. The generant 36 is loose-filled into the annular space 30. Unlike some existing designs, there is no need to load the generant into a pouch.

The generant cover 32 is selectively positionable over the tubular body 26 of the generant holder 24 to engage and secure the generant 36 in the annular space 30. The bottom of the U-shape of the generant cover 32 engages the generant 36 in the annular space 30. A position of the generant cover 32 thus varies as a function of an amount of the generant 36 in the annular space 30. If a particular design requires only a small amount of generant 36, the row of apertures 34 closest to the initiator assembly 14 may be positioned farther downstream in the tubular body 26.

Figure 6:
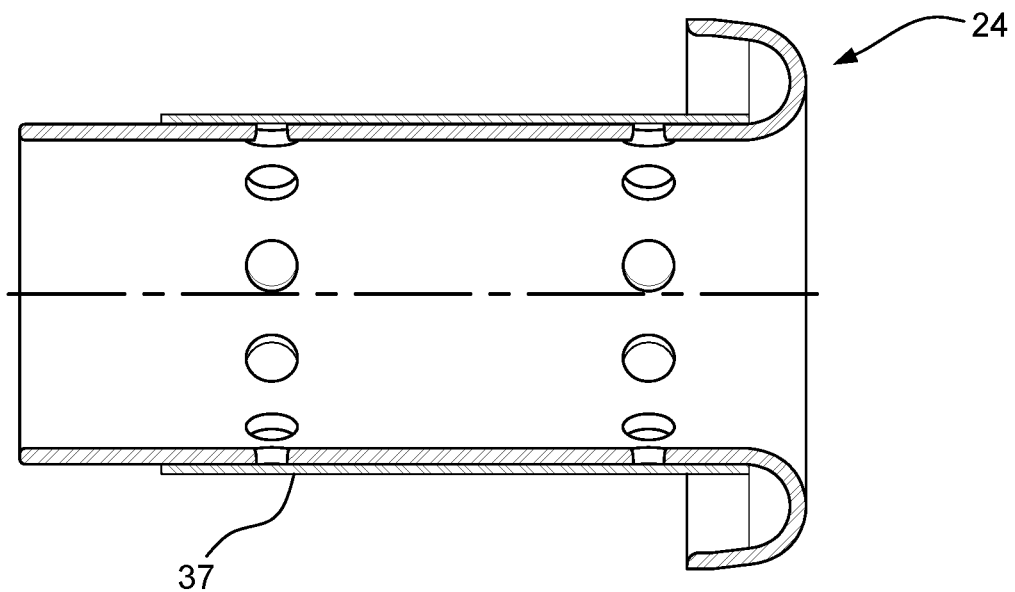
FIGS. 6 and 7 show the generant holder with a sleeve.
Figure 7:
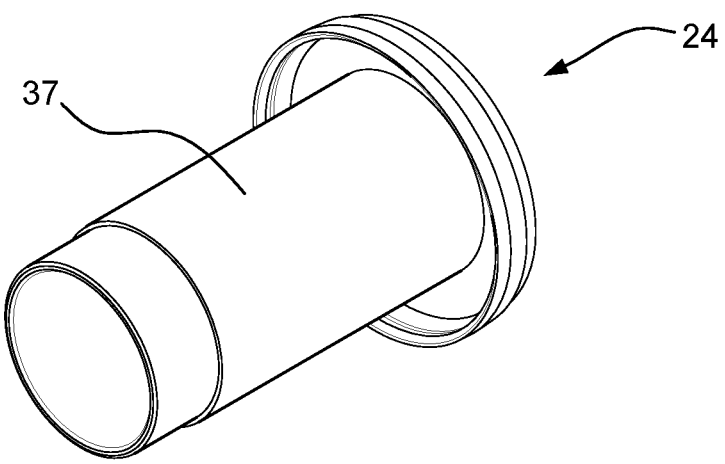

In some embodiments, with reference to FIGS. 6 and 7, the generant holder 24 may be provided with a sleeve 37 such as a paper sleeve or the like positioned over the tubular body 26. The sleeve 37 serves to prevent generant particles from going through the apertures 34 without affecting functionality or operation of the airbag inflator 10. The sleeve 37 also facilitates the use of granules for the generant 36 if desired. The sleeve 37 may be held in place with the generant cover 32 or by friction on the tubular body 26 or both.

A rupture disk 38 is positioned adjacent the manifold 16. In some embodiments, the rupture disk 38 is a cruciform disk including a pair of linear score lines that intersect at a center of the disk 38 to form a cruciform scoring pattern. The cruciform score lines control the manner in which the rupture disk 38 fractures, thereby preventing pieces of the rupture disk 38 from blocking apertures 40 in the manifold 16.

Figure 8:
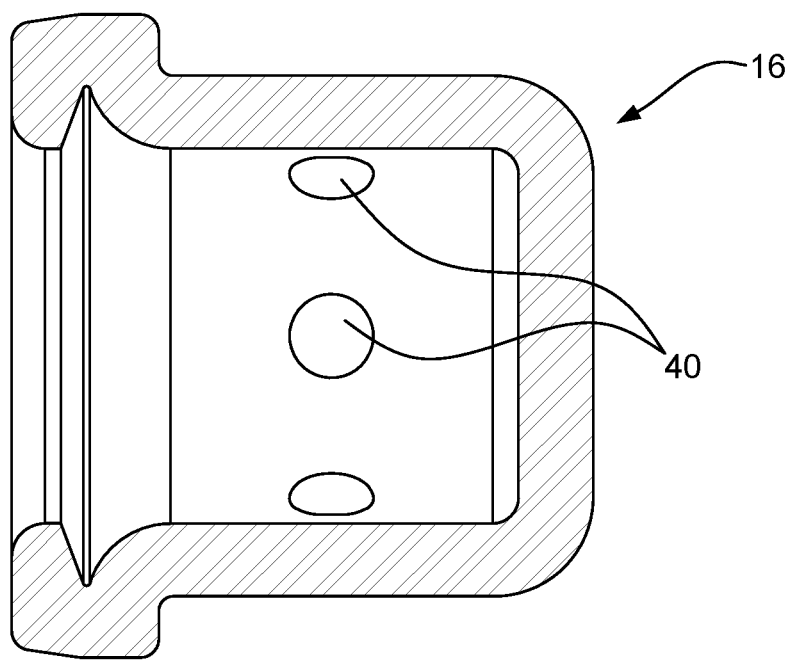
FIG. 8 is a sectional view of the manifold.

FIG. 8 is a cross-sectional view of the manifold 16. The manifold 16 includes a plurality of the apertures 40 as shown and is configured to choke gas flow to control the slope and time to maximum pressure.

The inflator 10 is activated via the initiator assembly 14 receiving an electronic activate signal. Activating the initiator assembly 14 breaks through the initiator sleeve 18, which will ignite the generant 36 and allow a pressure wave to travel to the outlet burst disk 38, thereby opening the disk 38. As the generant 36 burns, the apertures 34 serve to control the burn and provide for consistent heating of the inert gas in the pressure vessel 12. The apertures 34 control the flow rate for gases burned by the propellant. The manifold 16 chokes the flow of the gas, thereby controlling the slope, IOP, and time to maximum pressure in the airbag. The number of apertures 40 in the manifold 16 and the size of the apertures are specifically configured to prevent the gas from entering the airbag too fast, which could result in a blown bag, or too slow, which would obviate functionality.

The open center in the generant holder assembly provides a clear path for the pressure wave generated by the initiator assembly. As a consequence, the inflator can function using a lower internal operating pressure, which results in an increased safety factor. Apertures in the generant holder control the propellant burn and allow for consistent heating of the inert gas in the pressure vessel, which further serves to increase the safety factor. The design additionally allows for reduced time to first gas (TTFG), which is an advantage over previous tortuous path designs While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An airbag inflator comprising:
   a pressure vessel defining an outside diameter of the airbag inflator;
   an initiator positioned at one end of the pressure vessel;
   a manifold positioned at an opposite end of the pressure vessel; and
   a generant holder assembly secured in the pressure vessel adjacent the initiator and directly engaging an interior wall of the pressure vessel, the generant holder assembly defining an annular space with the interior wall of the pressure vessel that is configured to secure a generant, wherein a center of the generant holder assembly is open.

2. An airbag inflator according to claim 1, wherein the generant holder assembly comprises:
   a generant holder including a tubular body and an annular ledge, the annular ledge having a larger diameter than the tubular body and being sized to be press fit into the pressure vessel engaging the interior wall of the pressure vessel; and
   a generant cover including a central opening sized to fit over the tubular body of the generant holder and an outside diameter sized to be press fit into the pressure vessel, engaging the interior wall of the pressure vessel.

3. An airbag inflator according to claim 2, further comprising a generant positioned in the annular space and engaging the annular ledge, wherein the generant cover is selectively positionable over the tubular body to engage and secure the generant in the annular space, and wherein a position of the generant cover varies as a function of an amount of the generant in the annular space.

4. An airbag inflator according to claim 3, wherein the generant cover is U-shaped, and wherein a bottom of the U-shape engages the generant in the annular space.

5. An airbag inflator according to claim 2, wherein the generant holder comprises at least one row of holes arranged circumferentially in the tubular body.

6. An airbag inflator according to claim 5, wherein the generant holder comprises two rows of holes arranged circumferentially in the tubular body.

7. An airbag inflator according to claim 2, wherein the annular ledge is U-shaped and is continuous with the tubular body.

8. An airbag inflator according to claim 7, wherein the generant cover is U-shaped.

9. An airbag inflator according to claim 2, wherein the generant holder assembly further comprises a sleeve positioned over the tubular body.

10. An airbag inflator according to claim 9, wherein the sleeve is a paper sleeve.

11. An airbag inflator according to claim 1, wherein the generant holder assembly comprises a generant holder including a tubular body and a sleeve positioned over the tubular body.

12. An airbag inflator according to claim 11, wherein the generant holder comprises an annular ledge having a larger diameter than the tubular body and being sized to be press fit into the pressure vessel, and a generant cover including a central opening sized to fit over the tubular body of the generant holder and an outside diameter sized to be press fit into the pressure vessel, wherein the sleeve is positioned between the annular ledge and the generant cover.

13. An airbag inflator according to claim 1, wherein the manifold includes a plurality of apertures and is configured to choke gas flow to control a slope, internal operating pressure, and time to maximum pressure.

14. An airbag inflator comprising:
a pressure vessel defining an outside diameter of the airbag inflator;
an initiator positioned at one end of the pressure vessel;
a manifold positioned at an opposite end of the pressure vessel;
a generant holder secured in the pressure vessel adjacent the initiator, the generant holder including a tubular body and an annular ledge, the annular ledge having a larger diameter than the tubular body and being sized to be press fit into the pressure vessel, the generant holder defining an annular space between the tubular body and an interior wall of the pressure vessel, wherein a center of the generant holder is open to a downstream portion of the pressure vessel prior to and after initiation of the airbag inflator; a generant positioned in the annular space and engaging the annular ledge; and a generant cover secured in the pressure vessel over the tubular body of the generant holder, the generant cover being selectively positioned to engage and secure the generant in the annular space.

15. An airbag inflator according to claim 14, wherein a position of the generant cover varies as a function of an amount of generant in the annular space.

16. An airbag inflator according to claim 14, wherein the generant holder comprises two rows of holes arranged circumferentially in the tubular body.

17. An airbag inflator according to claim 14, further comprising a sleeve positioned over the tubular body.

18. An airbag inflator according to claim 17, wherein the sleeve is a paper sleeve.

19. An airbag inflator comprising:
a pressure vessel defining an outside diameter of the airbag inflator;
an initiator positioned at one end of the pressure vessel;
a manifold positioned at an opposite end of the pressure vessel; and
a generant holder assembly secured in the pressure vessel adjacent the initiator, the generant holder assembly defining an annular space that is configured to secure a generant, wherein a center of the generant holder assembly is open to a downstream portion of the pressure vessel prior to and after initiation of the airbag inflator, wherein the generant holder assembly comprises a generant holder including a tubular body and an annular ledge, the annular ledge having a larger diameter than the tubular body and being sized to be press fit into the pressure vessel, and wherein the annular ledge is U-shaped and is continuous with the tubular body.

* * * * *